Feb. 5, 1924.  
R. D. FAY  
1,482,980  
DIRECTION DETECTOR FOR SUBMARINE SOUNDS  
Filed June 27, 1919     2 Sheets-Sheet 1
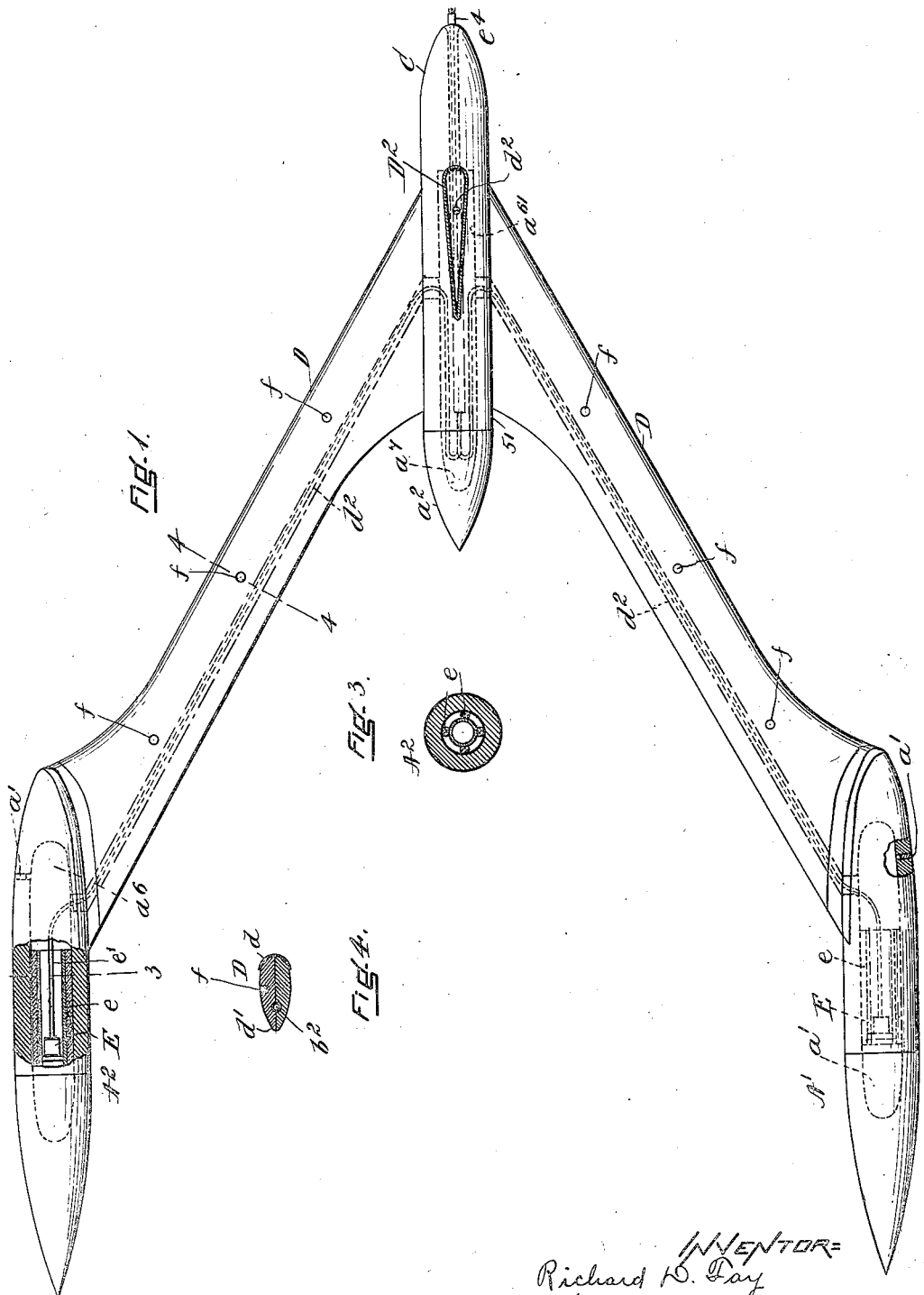
INVENTOR:  
Richard D. Fay  
By his Attorneys

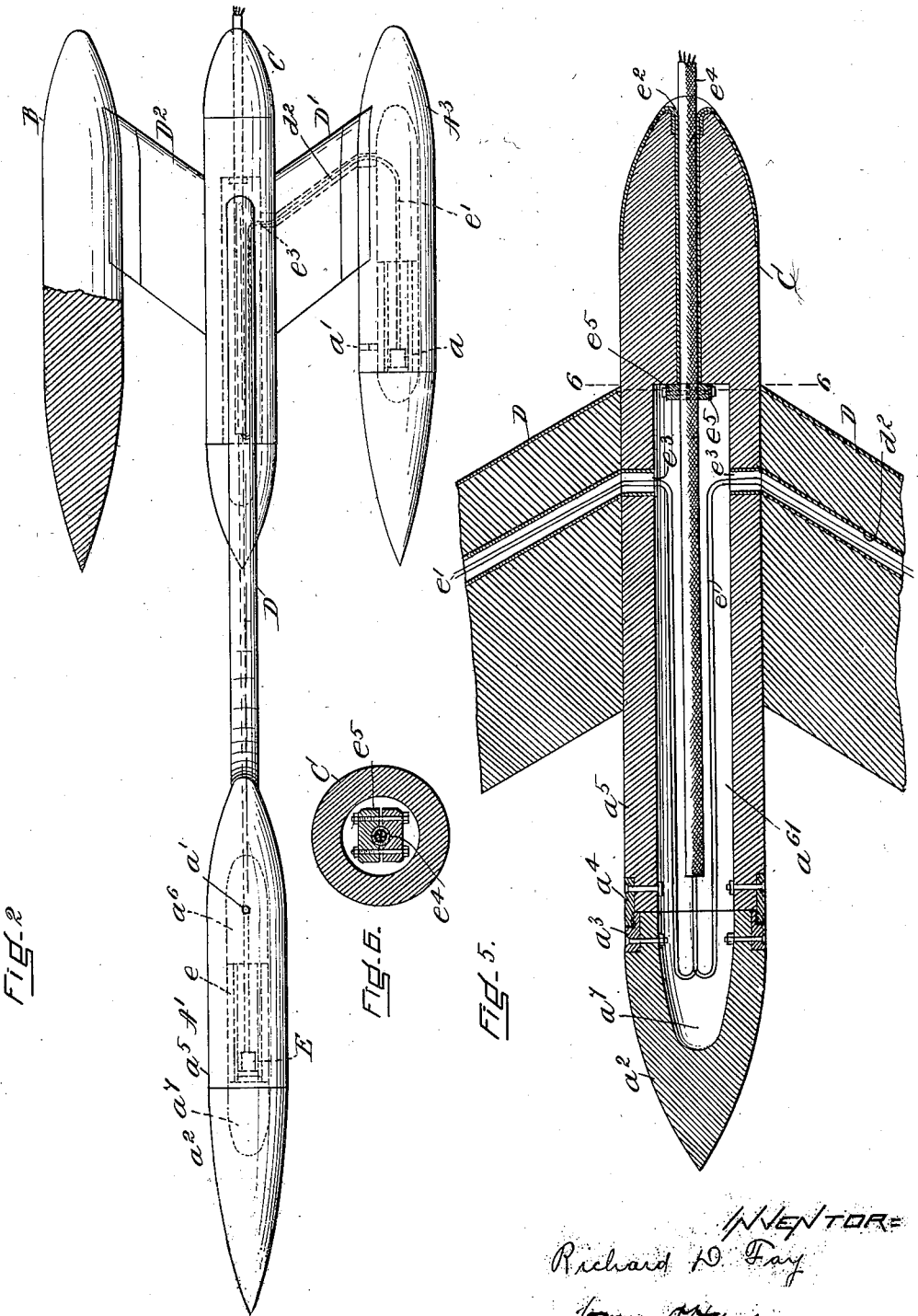

Patented Feb. 5, 1924.

1,482,980

UNITED STATES PATENT OFFICE.

RICHARD D. FAY, OF NAHANT, MASSACHUSETTS, ASSIGNOR TO SUBMARINE SIGNAL COMPANY, OF PORTLAND, MAINE, A CORPORATION OF MAINE.

DIRECTION DETECTOR FOR SUBMARINE SOUNDS.

Application filed June 27, 1919. Serial No. 307,231.

*To all whom it may concern:*

Be it known that I, RICHARD D. FAY, of Nahant, in the county of Essex and State of Massachusetts, a citizen of the United States, have invented a new and useful Improvement in Direction Detectors for Submarine Sounds, of which the following is a specification.

My invention relates to the reception of compressional or sound waves and an apparatus embodying it such as is shown in the drawings is especially designed to receive submarine signals or the noises originating in submarine or other vessels, seen or unseen. The apparatus below described has the advantage of being equally useful whether it is being towed behind a moving vessel or merely drifting from a ship or other station.

The circuit for the indicator or listening-in instrument may contain a compensator of the kind shown in application Serial No. 238,839, filed by me June 8, 1918, in which means are provided for changing the length of the air passages between two receivers to compensate for the difference of time taken by the sound from the source to the indicator, using, however, microphones connected to the receivers and magneto phones mounted in the compensator instead of listening tubes as the means for conveying the sound from the receivers to the compensator, by which they may be compared.

My invention will be understood from the drawings, in which it is shown in its preferred form.

Figure 1 is a plan, the front member being omitted, and

Fig. 2 is a side elevation of a device embodying my invention.

Figs. 3 and 4 are sections on line 3—3 and 4—4, respectively, of Fig. 1.

Fig. 5 is a horizontal sectional detail of a portion of Fig. 2.

Fig. 6 is a section on line 6—6 of Fig. 5.

My device consists of five members usually called fishes, of which three, $A^1$, $A^2$, $A^3$, are hollow, one B, is a float, and the fifth, C, is a towing member. The members $A^1$ and $A^2$ are joined to the towing member C by ribs D, and the towing member C is joined to the members $A^3$ and B by rigs $D^1$ and $D^2$. The device as a whole is preferably made of wood.

The fishes $A^1$, $A^2$ and $A^3$ are alike, and each have perforations $a^1$ by which it may fill with water and so transmit the sound from the body to the microphone. Each fish $A^1$, $A^2$, $A^3$ and the fish $C^1$ is preferably made in two parts $a^2$, $a^5$. Their construction in this respect and means of attachment together of the two parts is shown in Fig. 5, where the fish C is shown. The part $a^2$ has attached to it a threaded metallic collar $a^3$ adapted to screw into a threaded metallic collar $a^4$ attached to the other part $a^5$, so that the two parts may be firmly screwed together. Other means of attachment may be used if desired. The parts $a^2$ and $a^5$ of fishes $A^1$, $A^2$ and $A^3$ are each hollowed out as at $a^6$ and $a^7$ and in the chamber $a^6$ of $A^1$, $A^2$ and $A^3$ is located a microphone E of ordinary construction, this microphone being preferably set into a piece of rubber tubing $e$, into which it fits, and is centered in the chamber by a flexible or sound insulating means such as fins or ribs $e$ in Fig. 3, or by sponge rubber so that the microphone is held firmly but not rigidly in place. The rubber tube and connections serve to insulate the microphone from lateral noises as well as to hold it in place.

The member C is also chambered as at $a^{61}$ and $a^{71}$, but its forward end has a passage $e^2$ through it and also perforations $e^3$ to receive the microphone $e^1$ as below described. These parts are preferably made of wood for lightness, combined with strength.

The ribs are made of wood and are shaped and connected to the fishes in any suitable manner but in such a way and at such an angle as to offer as little resistance to the water as possible. In fact, the whole device is constructed with the idea of being maintained under all ordinary and normal conditions in approximately a horizontal plane whether at rest or while being towed and of being moved through the water with but little resistance and hence of reducing to a minimum water eddies which of necessity cause undesirable noises and interfere with the sounds which the device is intended to pick up.

In practice it has been found best to shape the ribs in cross section as shown in Fig. 4 where $d$ indicates the forward or entering edge of the rib from which the water slides off at the sharp rear edge $d^1$, these forward edges being shod with metal to protect the device when hauled on board ship. The ribs D and $D^1$ contain passages preferably lined with tubes $d^2$ which connect the chambers $a^6$ with the chamber $a^{61}$, and the leads $e^1$ from the microphones in fishes $A^2$, $A^3$ pass out from the chambers $a^6$ through the passages $d^2$ to the interior $a^{61}$ of the towing fish C where they are joined by the leads $e^1$ from the microphone E in fish $A^3$ which in like manner passes through the tube $d^2$ in rib $D^1$ into the interior of the towing fish C. Here the leads from the fishes $A^1$, $A^2$, $A^3$ are assembled to form a cable $e^4$ and pass out through a tube $e^2$ to the indicator at the other receiving station on board ship or elsewhere. A compensator of ordinary construction is preferably used to receive the electrical impulses.

The cable $e^4$ may be used to tow the device. To prevent the cable from being pulled through and out of the fish a clamp $e^5$ is attached to the cable $e^4$ and engages the forward wall of chamber $a^{61}$ (see Figs. 5 and 6).

The fish B is preferably a solid piece of wood and is used for buoyancy.

In practice it is best to allow plenty of slack wire in the fish C so that the leads $e^1$ and cable $e^4$ may easily be joined or their joint be examined or repaired. The clamp $e^5$ may be of any usual character and engages the front wall of the chamber $a^{61}$ as shown. The passage $e^2$ preferably is lined with a metallic tube.

The ribs D are preferably weighted by metal plugs $f$, but they may be otherwise weighted if desired, the purpose of the weighting and of the filling of the chambers in the fishes $A^1$, $A^2$, $A^3$ and C and the tubes with water being to give the device as a whole neutral buoyancy so that it may be caused to float or drift or be towed so that it may be caused to boat or drift or be towed at such a depth, say 20 feet, below the surface as will adapt it to receive the sound waves desired. This can easily be found in any given case by experiment, the weight of the cable on the nose of the device being also taken into account.

The ribs D are say four feet long and are spread so that the fishes $A^1$, $A^2$ are about four feet apart, the three fishes thus being at the apexes of an equilateral triangle.

While the fishes $A^1$, $A^2$ might be joined by a brace constructed exteriorly like the ribs D, such construction adds to the water resistance in towing and adds to the water noises so that the device although useful is not so sensitive to the reception of the desired sounds as it otherwise would be.

For the best results the device should remain in fixed relation to the course in which it is being towed and should be balanced so that it will tow in an approximately horizontal plane. It should offer a minimum of resistance in being towed and hence the shapes of the fishes and ribs which are preferably adopted to give stream-line results.

Its V-like arrangement, as well as the use of the float, makes for stability and when being towed its cable should be sufficiently long to allow it to loop sufficiently under water to maintain the device at its desired level and allow sufficient slack to eliminate sudden jerks. The device is preferably made symmetrical, i. e., the fishes $A^1$, $A^2$, $A^3$ are at the apexes of an equilateral triangle, as above stated, and the fishes $A^3$ and B at equal distances from the fish C.

Provision may be made if necessary for trimming the device as a whole by the use of plugs like the plugs $f$ wherever desired for the device as a whole should for the best results be so trimmed as to be always approximately horizontal whether it is being towed or at rest.

Other constructions similar in character may accomplish these results, but the device as described above is the best known to me for the purpose.

The microphones E are each electrically connected in circuit with a battery and some form of indicator (not shown) such that the vibrations received by the microphones may be compared. Such apparatus is now well known in the art and forms no part of my invention and hence need not be particularly described except to state that by comparing the indications of the microphones two at a time (for example, first compare the indications from fishes $A^1$ and $A^2$ and then those from $A^1$ and $A^3$) the direction from which the sound vibrations are coming may be determined. It is of course understood that where for example three microphones are used as shown in the drawings comparison may be made between the sounds coming to the microphone $A^1$ and the sounds coming to microphone $A^2$. A similar comparison may then be made between the sounds coming to $A^1$ and $A^3$, respectively, and then between the sounds coming to $A^2$ and $A^3$, respectively. By these various comparisons it will be readily understood that the exact direction from which the sound comes may be determined with accuracy.

What I claim as my invention is:

1. A device of the kind described comprising a plurality of receivers located equally distant apart and in approximately a horizontal plane, each carrying a microphone, and a float for supporting said device rigidly connected thereto.

2. A device of the kind described comprising a plurality of receivers located substantially equally distant apart and in approximately a horizontal plane, each carrying a microphone, and a float for supporting said device, and means for regulating the weight of said device, whereby its depth of submersion may be adjusted.

3. A device of the kind described comprising a plurality of receiving casings, each containing a sound receiver, said receivers being located substantially equally distant apart and in approximately a horizontal plane, and a float for supporting said device.

4. A device of the kind described comprising a plurality of receiving casings, each containing a sound receiver, said receivers being located substantially equally distant apart and in approximately a horizontal plane, a float for supporting said device, and ribs connecting said receivers and said float.

5. A device of the kind described comprising three receivers located substantially equidistant from each other and in approximately a horizontal plane, a towing member, and ribs connecting said receivers and said towing member.

6. A device of the kind described comprising three receivers located substantially equidistant from each other, a towing member, and ribs connecting said receivers and said towing member, said device being weighted whereby it will be in the water in approximately horizontal position whether being towed or at rest.

7. A device of the kind described comprising three receivers located substantially equidistant from each other and in approximately a horizontal plane, ribs, a towing member, said ribs connecting said receivers and said towing member, said ribs being thick at their forward edges and tapering in cross section towards their rear edges whereby on being drawn through the water the water will slide off their rear edges with a minimum of eddy.

8. A device of the kind described comprising three receivers located substantially equidistant from each other and in approximately a horizontal plane, ribs, a towing member, said ribs connecting said receivers and said towing member, each receiver containing a microphone having leads, said ribs being provided with passages connecting said receivers and said towing member through which pass said leads, and said towing member having a passage through which said leads may pass out of the device whereby said device may be towed.

9. A device of the kind described comprising a towing member, a float located above said towing member, a receiving member located below said towing member, and a plurality of receiving members located in the rear of said towing member, said receiving members each containing a microphone having leads, said leads assembling in said towing member and being attached thereto whereby they may serve as a means of towing said device, said receiving members being in substantially the same horizontal plane.

RICHARD D. FAY.